(12) United States Patent
Morra et al.

(10) Patent No.: US 6,411,886 B1
(45) Date of Patent: Jun. 25, 2002

(54) METHOD OF DETECTING AND CONTROLLING DETONATION OF AN INTERNAL COMBUSTION ENGINE

(75) Inventors: Gianluca Morra, Avigliana; Stefano Re Fiorentin, Grugliasco; Paolo Tubetti, Settimo Torinese; Gianpiero Einaudi, Turin, all of (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 09/446,988

(22) PCT Filed: Sep. 9, 1999

(86) PCT No.: PCT/IT98/00244

§ 371 (c)(1),
(2), (4) Date: Mar. 22, 2000

(87) PCT Pub. No.: WO99/13308

PCT Pub. Date: Mar. 18, 1999

(30) Foreign Application Priority Data

Sep. 9, 1997 (IT) .......................... TO97A0800

(51) Int. Cl.⁷ ............................ G01L 23/22; F02P 5/152
(52) U.S. Cl. ............... 701/111; 123/406.38; 123/406.47; 73/35.04; 73/117.3
(58) Field of Search ................................. 701/102, 103, 701/104, 105, 111; 123/406.37, 406.38, 406.47; 73/35.04, 35.09, 35.1, 117.3; 702/66, 189, 190

(56) References Cited

U.S. PATENT DOCUMENTS

| | | | |
|---|---|---|---|
| 4,562,818 A | * | 1/1986 | Kohama et al. ............ 701/111 |
| 5,134,980 A | * | 8/1992 | Sakakibara et al. ..... 123/406.38 |
| 5,188,080 A | * | 2/1993 | Sakakibara et al. ..... 123/406.38 |
| 5,386,722 A | * | 2/1995 | Meyer et al. ............... 73/117.3 |
| 5,608,633 A | * | 3/1997 | Okada et al. ................ 701/111 |
| 5,806,014 A | * | 9/1998 | Remboski et al. ........... 701/111 |
| 5,848,372 A | * | 12/1998 | Ito et al. ..................... 701/111 |
| 5,978,728 A | * | 11/1999 | Fontana et al. ............. 701/111 |

FOREIGN PATENT DOCUMENTS

IT   WO 97/21084   6/1997

* cited by examiner

Primary Examiner—Willis R. Wolfe
(74) Attorney, Agent, or Firm—Crowell & Moring LLP

(57) ABSTRACT

A method of detecting and controlling detonation, including the steps of: generating (10) a vibration signal (D) proportional to the intensity of vibration on the crankcase; wide-band-filtering (11) the vibration signal (D) to generate a first intermediate signal; rectifying (12) the first intermediate signal to generate a second intermediate signal; integrating (13) the second intermediate signal to generate a first numeric value; calculating (14) a logarithm of the first numeric value to obtain a second numeric value ($X_i$); calculating (16) a difference between the second numeric value ($X_i$) and the mean value ($\mu_i$) to obtain a third numeric value ($\delta_i$) with a predetermined threshold value ($\delta_o$); determining (18) the presence of detonation in the event the third numeric value ($\delta_i$) has a first predetermined relationship with the predetermined threshold value ($\delta_o$); forming (19, 21) a detonation index ($I_i$) indicating the behavior of the engine in terms of detonation; and obtaining (22) a spark lead correction value ($CA_i$) as a function of the detonation index ($I_i$).

15 Claims, 3 Drawing Sheets

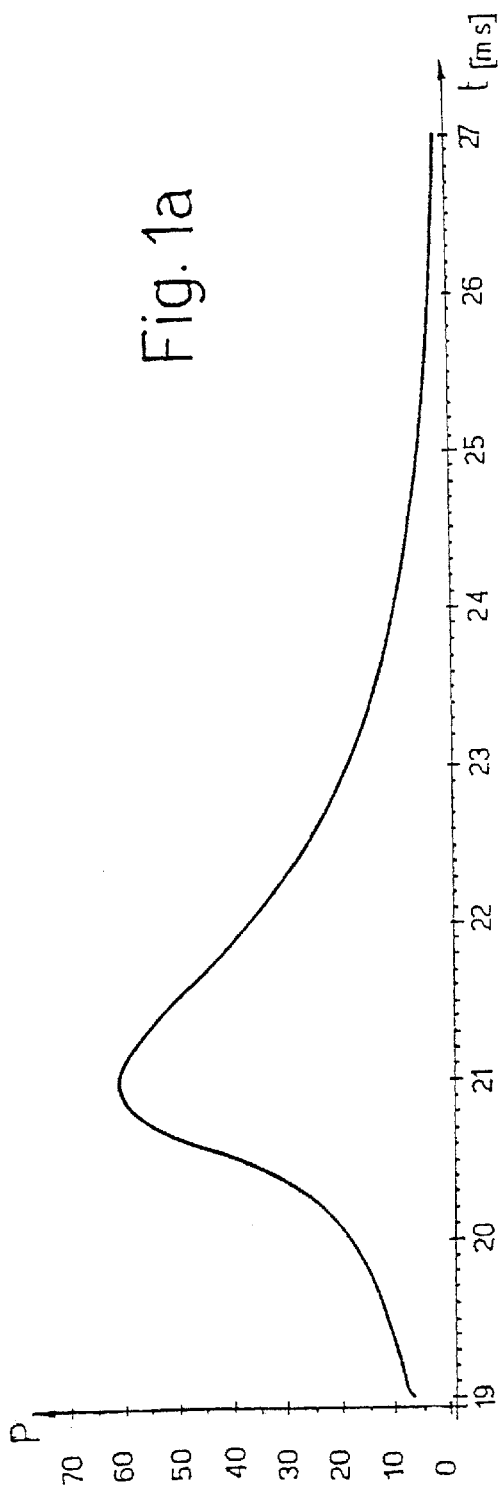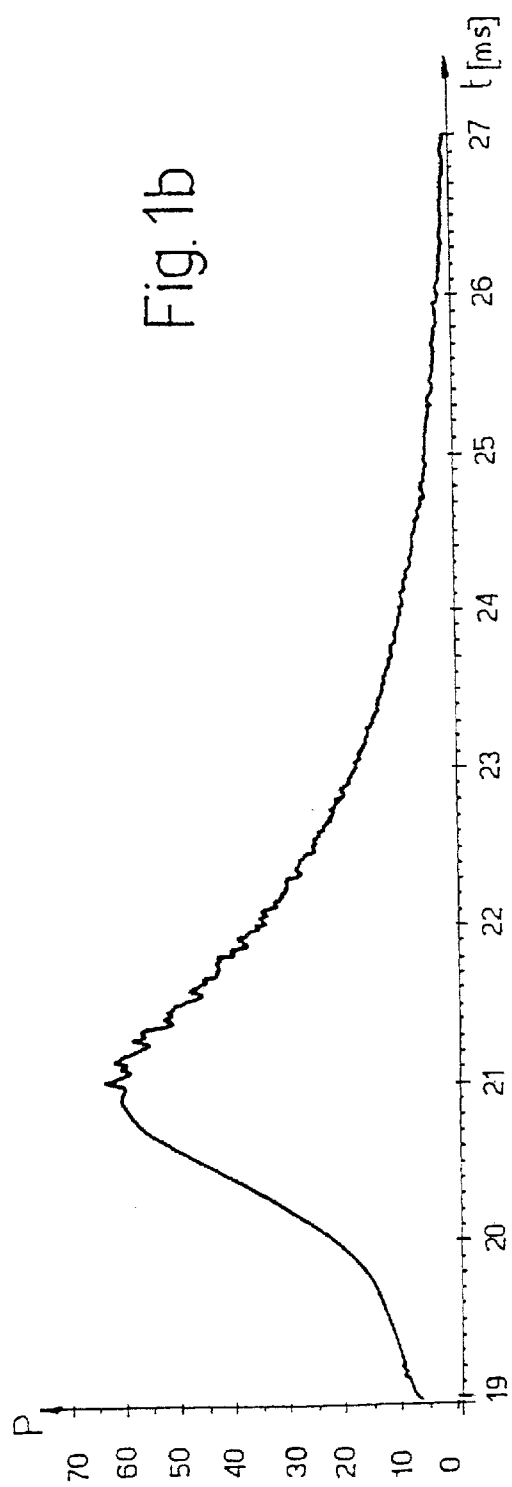

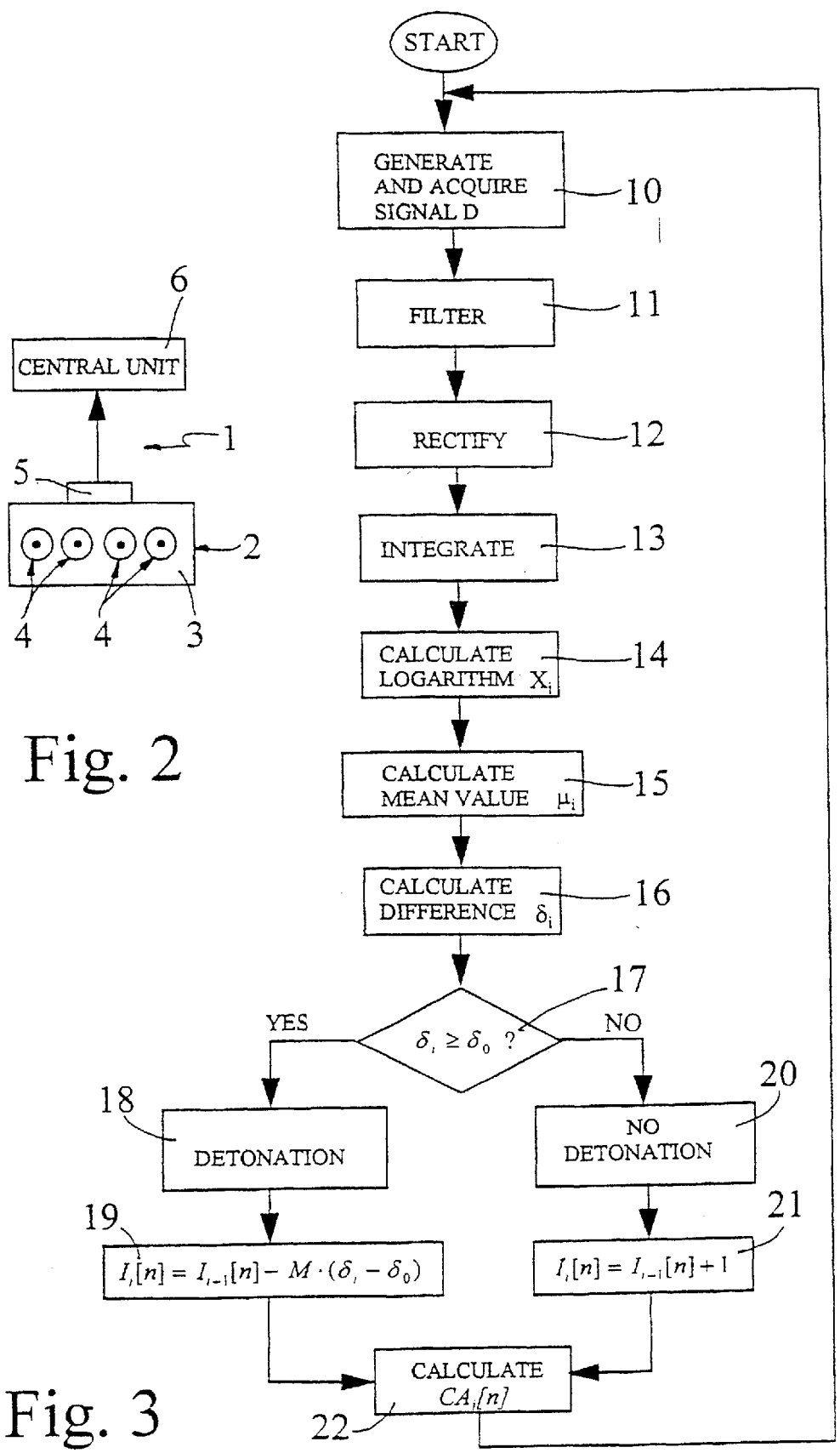

METHOD OF DETECTING AND CONTROLLING DETONATION OF AN INTERNAL COMBUSTION ENGINE

TECHNICAL FIELD

The present invention relates to a method of detecting and controlling detonation of an internal combustion engine.

BACKGROUND ART

As is known, in certain operating conditions, internal combustion engines are subject to high-intensity detonation, i.e. spontaneous combustion of the mixture, which occurs in many engine cycles, and results in impaired efficiency, dangerous overheating and reduced life of the engine, as well as possibly in sudden failure of certain engine components.

Various systems are therefore being studied, or have already been proposed, to detect detonation and act accordingly on combustion parameters to reduce its effects and the likelihood of it occurring.

Such systems are mainly based on directly or indirectly monitoring the pressure cycle pattern in the cylinder as a function of the position of the piston inside the cylinder. The pressure cycle pattern is bell-shaped, reaching a peak close to the top dead-center position, which peak is a classic rounded shape when combustion is normal (FIG. 1a), and has numerous indentations in the presence of detonation (FIG. 1b).

Information by which to detect detonation is obtained by analyzing the indentations.

Some known methods employ sensors located inside the combustion chamber to directly determine the amplitude of the indentations. While providing for highly accurate, reliable amplitude values, such a sensor arrangement calls for sophisticated high-cost technology and is therefore only suitable for laboratory or prototype application.

Other methods employ sensors located, and for detecting vibration, on the crankcase. Though technically simpler and cheaper, the values obtained by such sensors are subject to greater interference than those detected directly, on account of the vibration measured on the crankcase also being the result of other phenomena besides crankcase-filtered variations in pressure inside the cylinder.

Patent GB-A-2 265 006 filed by Nippondenso Co Ltd, for example, relates to a detonation control system featuring detonation sensors on the crankcase, and which detects detonation by comparing the intensity of the sensor signal with a decision threshold, and provides for eliminating detonation by accordingly controlling engine operating parameters, such as injection advance. More specifically, the system performs a logarithmic conversion of the intensity of the sensor signal, determines its distribution, calculates a value corresponding to the standard deviation of the distribution, and compares the value with a threshold calculated on the basis of the previously calculated value and a mean value of said distribution.

The distribution is determined by processing numeric values representing the amplitudes of spectral components obtained by narrow-band filtering the output signal of the sensors. The output signal, in fact, comprises numerous harmonics, and narrow-band filtration is employed to only extract the highest-energy harmonic.

It is important to note that, in the above patent, the detonation threshold is adapted at each cycle.

In some cases, however, controlling operation of the engine on the basis of one frequency in the spectrum and one engine cycle at a time may prove restrictive.

That is, considering only one frequency may result in others, different from the one considered but generated all the same by detonation, being overlooked, while control designed solely to eliminate local detonation cycle by cycle may not always be the best solution, in that, in terms of engine operation and efficiency, it sometimes pays to tolerate a given number of detonations every so many engine cycles and/or in only some of the cylinders. Trace detonation, in fact, by enabling high efficiency of the engine, is a favourable engine operating condition, and therefore one to be encouraged.

Finally, adapting the decision threshold calls for numerous numeric processing operations, which further complicate implementation of the method.

One proposal to eliminate the aforementioned drawbacks is the detonation detecting method described in Patent Application WO-97/21084 filed on Nov. 29, 1996 by the same Applicant and published on Dec. 06, 1997.

The detection method in the above patent application provides for wide-band filtering and rectifying the output signal of an acceleration sensor on the crankcase; integrating the rectified signal in a time window appropriately located with respect to the combustion considered; and effecting a logarithmic conversion of the integration result.

Repeating the above operations for each combustion of the engine provides for defining a distribution of values, of which are calculated, at each combustion, a mean value and a numeric value correlated to the standard deviation on the basis of previous combustion values. On the basis of the numeric value and a predetermined threshold value which is constant alongside variations in engine speed, a detonation coefficient value is then calculated at each engine combustion, and which indicates the detonation "propensity" of the engine.

DISCLOSURE OF INVENTION

It is an object of the present invention to provide an improved detonation detecting method as compared with that described in Patent Application WO-97/21084.

According to the present invention, there is provided a method of detecting and controlling detonation of an internal combustion engine, comprising the steps of:

a) acquiring a vibration signal proportional to the intensity of vibration on the crankcase;

b) wide-band filtering said vibration signal to generate a first intermediate signal;

c) rectifying said first intermediate signal to generate a second intermediate signal;

d) integrating said second intermediate signal to generate a first numeric value;

e) calculating a logarithm of said first numeric value to obtain a second numeric value;

f) calculating a mean value as a function of said second numeric value;

characterized by comprising the steps of:

g) calculating a difference between said second numeric value and said mean value to obtain a third numeric value;

h) comparing said third numeric value with a predetermined threshold value;

m) determining the presence of detonation in the event said third numeric value has a first predetermined relationship with said predetermined threshold value;

n) forming a detonation index indicating the behaviour of the engine in terms of detonation; and o) calculating, from said detonation index, a correction value to be added to the spark lead.

BRIEF DESCRIPTION OF DRAWINGS

A preferred, non-limiting embodiment of the present invention will be described by way of example with reference to the accompanying drawings, in which:

FIGS. 1a and 1b show two pressure cycle graphs in the absence and presence of detonation respectively;

FIG. 2 shows a simplified diagram of a combustion system featuring the detection method according to the invention;

FIG. 3 shows a flow chart of a first embodiment of the detection method according to the invention;

BEST MODE FOR CARRYING OUT THE INVENTION

Figure 4:
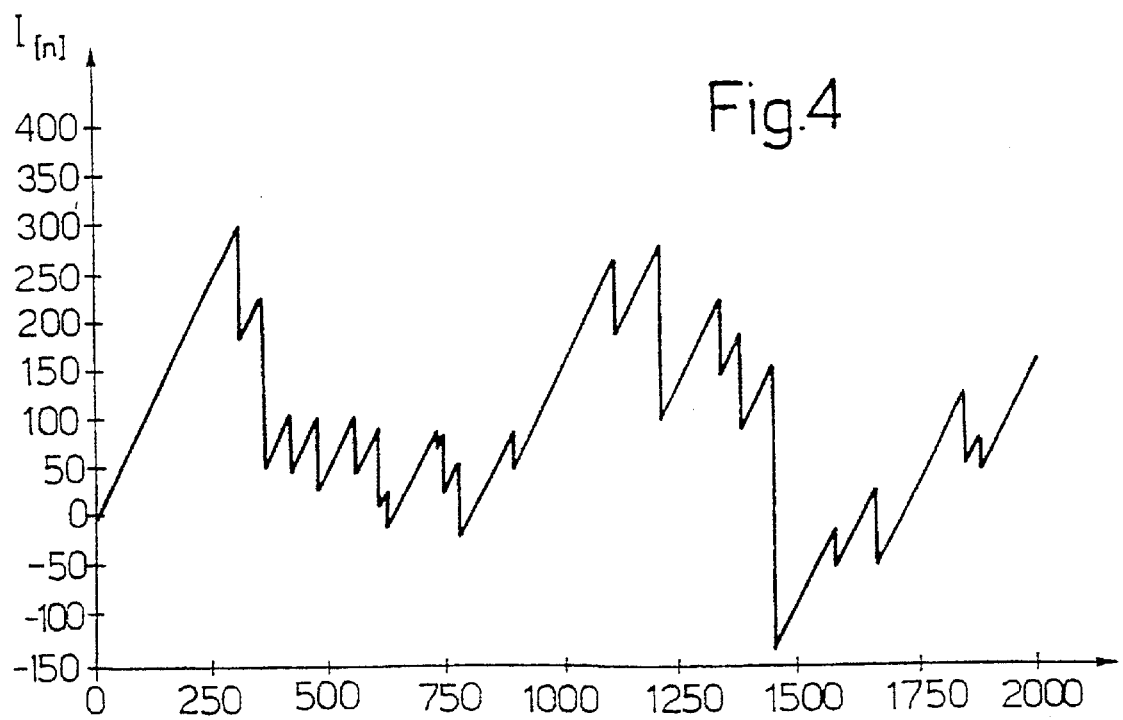
FIGS. 4 and 5 show graphs of certain quantities relative to the detection method according to the invention.

Number 1 in FIG. 2 indicates as a whole a detonation detecting device connected to an internal combustion engine 2, of which only the crankcase 3 and cylinders 4 are shown.

Detecting device 1 comprises a known acceleration sensor 5 (not described in detail) fitted to crankcase 3 of engine 2 and generating a vibration signal D correlated to the intensity of the vibration on crankcase 3; and a central processing unit 6 for receiving vibration signal D and implementing the operations relative to the method according to the present invention and described below with reference to the FIG. 3 flow chart.

The operations described with reference to FIG. 3 are repeated for each combustion of engine 2 to continually monitor detonation in the various engine cycles, and each of the values calculated in a generic i-th repetition is indicated hereinafter by the subscript "i".

In the following description, reference is made to a counter $I_i$ associated with the cylinder 4 of engine 2 in which the combustion considered takes place. More specifically, each cylinder 4 is assigned a respective counter I, and, to identify the various counters I in the following description, each is followed by an "[n]" term indicating the n-th cylinder 4 with which the counter is associated.

The counter values are initialized, e.g. set to 0, at the start of detection (e.g. when engine 2 is turned on) and are subsequently modified according to whether or not detonation is established in respective cylinders 4.

More specifically, and as will be made clear in the following description, the values of a counter I define a detonation index of engine 2 indicating the behaviour of engine 2 in terms of detonation.

As shown in FIG. 3, after each combustion of engine 2, vibration signal D is generated by acceleration sensor 5 and acquired by central processing unit 6 (block 10).

Vibration signal D is then wide-band filtered (block 11), rectified (block 12), and integrated in an appropriate time window (block 13).

More specifically, the integration time window commences at the combustion phase of the cylinder 4 considered, immediately following the top dead-center position, and is of constant angular duration with respect to the speed of engine 2, whereas the filtration band of vibration signal D is calibrated experimentally and normally ranges between 5 and 20 kHz.

The logarithm $x_i$ of the integration result is then calculated (block 14), and a corresponding mean value $\mu_i$ is determined as a function of logarithm value $x_i$ (block 15).

More specifically, mean value $\mu_i$ is calculated according to the equation:

$$\begin{cases} \mu_i = (1-\lambda_1)\cdot x_i + \lambda_1 \cdot \mu_{i-1} & i \geq 2 \\ \mu_1 = x_1 \end{cases}$$

where $\mu_i$ is the mean value calculated at the i-th repetition; $\mu_{i-1}$ is the mean value calculated at the previous repetition i−1; $x_i$ is the logarithm value calculated at the i-th repetition; and $\lambda_1$ is a predefined parameter.

As can be seen from the above equation, at the first repetition, the calculated mean value $\mu_i$ coincides with the calculated logarithm value $x_i$, whereas, from the second repetition onwards, mean value $\mu_i$ is updated on the basis of both the logarithm value $x_i$ calculated at the i-th repetition, and the mean value $\mu_{i-1}$ calculated at repetition i−1, each weighted according to parameter $\lambda_1$.

A peculiar characteristic of the above algorithm for updating mean value $\mu_i$ is that of defining a filter with a very small time constant enabling the calculated mean value to rapidly follow variations in the $x_i$ values obtained following logarithmic conversion of the integration result. This characteristic is extremely useful in transient states by ensuring precise tracking of vibration signal D.

Calculation of mean value $\mu_i$ is followed by calculating the value $\delta_1$ of the difference between value $x_i$ and mean value $\mu_i$ (block 16).

Value $\delta_1$ is then compared with a predetermined threshold value $\delta_o$ (block 17) to determine the presence or absence of detonation and accordingly modify the value of the counter $I_i[n]$ associated with the cylinder in question.

According to the present invention, threshold value $\delta_o$ is constant for all the repeat detection operations, is constant alongside variations in the speed of engine 2, and is correlated to the standard deviation value σ of the distribution of values $x_i$ in the absence of detonation.

In particular, the standard deviation value σ of the distribution of values $x_i$ in the absences of detonation is conveniently calculated on the basis of laboratory engine tests, by so setting the injection advance of the engine as to eliminate detonation. Given the standard deviation value σ, the corresponding threshold value $\delta_o$ is then calculated and conveniently memorized in central processing unit 6. Tests have shown that the best threshold value $\delta_o$ for reliably detecting detonation is roughly 3–4 times the standard deviation value σ.

Block 17 determines whether value $\delta_i$ is greater than or equal to predetermined threshold value, $\delta_o$. If $\delta_i$ is greater than or equal to threshold value $\delta_o$ (YES output of block 17), the presence of detonation in the cylinder 4 in question is established (block 18) and the value of counter $I_i[n]$ associated with the cylinder is modified (block 19) according to the equation:

$$I_i[n]=I_{i-1}[n]-M\cdot(\delta_i-\delta_o)$$

where M is a proportion coefficient, which is generally a function of the speed of engine 2 and the n-th cylinder considered at the time. In other words, by depending on the cylinder 4 considered, proportion coefficient M takes into account the transfer function of crankcase 3 in the combustion considered.

More specifically, at the i-th repetition, the value of the n-th counter $I_i[n]$ is calculated by decreasing the value of the n-th counter $I_i[n]$ at repetition i−1 by an amount proportional to the difference between value $\delta_i$ and threshold value $\delta_o$.

Conversely, if $\delta_i$ is less than threshold value $\delta_o$ (NO output of block 17), the absence of detonation in the cylinder 4 in question is established (block 20) and the value of counter $I_i[n]$ associated with the cylinder is modified (block 21) according to the equation:

$$I_i[n]=I_{i-1}[n]+1$$

That is, at the i-th repetition, the value of the n-th counter $I_i[n]$ is calculated by increasing by one unit the value of the n-th counter $I_i[n]$ at repetition i−1.

As stated, the current value of a counter $I_i[n]$ defines a detonation index of engine 2 indicating the behaviour of engine 2 in terms of detonation, i.e. the tendency of engine 2 to detonate. By increasing the value of the counter when no detonation is detected in the respective cylinder, and decreasing the counter value when detonation is detected, it therefore follows that high positive counter values indicate a tendency of engine 2 either not to detonate or to detonate in temporally widely spaced engine cycles, whereas high negative counter values indicate a tendency of engine 2 to detonate.

Once the value of counter $I_i[n]$ is modified according to whether the presence or absence of detonation is established in the respective cylinder (block 19 or 21), the current value $I_i[n]$ of the counter is used to determine an injection advance correction value $CA_i[n]$ relative to the n-th cylinder 4 considered, and defining the best correction to be made to the injection advance of the cylinder to control detonation in the cylinder as required (block 22). The injection advance correction value $CA_i[n]$ is determined according to the equation:

$$CA_i[n]=K_P \cdot I_i[n]$$

where $I_i[n]$ is the current value of the n-th counter at the i-th repetition; and $K_p$ is a factor defining how the advance correction is to be implemented.

In particular, $K_p$ may be constant alongside variations in the speed of engine 2, or may be a function of the speed of engine 2.

Figure 5:
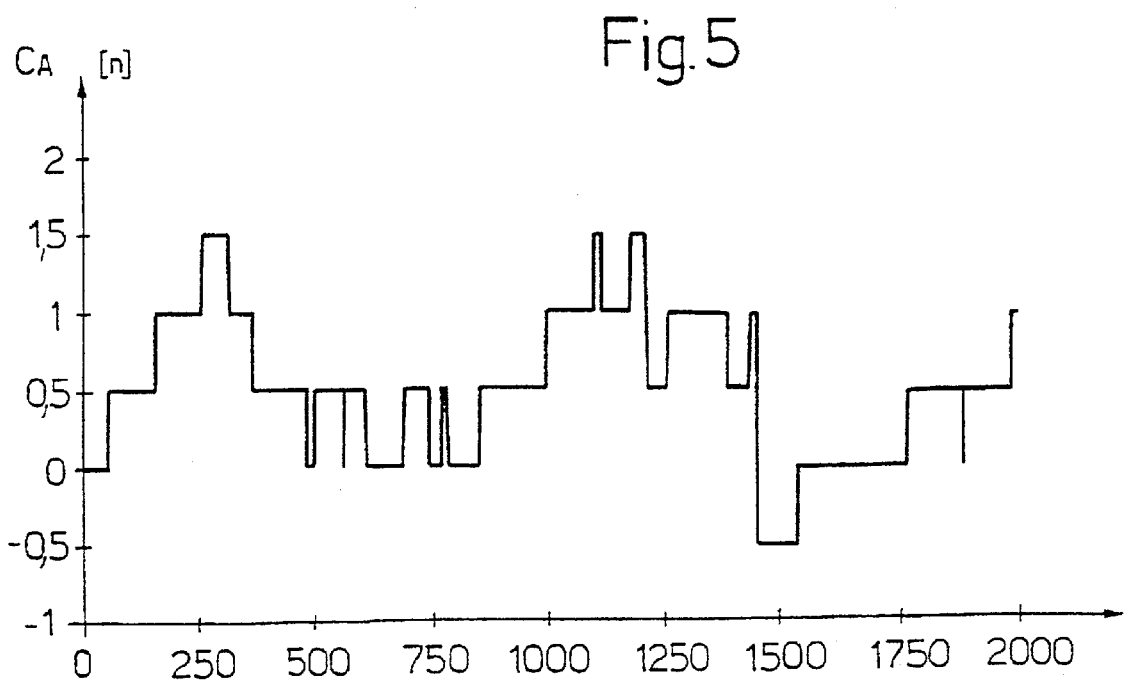

Purely by way of example, FIG. 4 shows a graph of the value $I_i[n]$ assumed, in successive engine cycles, by a counter associated with a cylinder 4 of engine 2; and FIG. 5 shows a graph of the advance correction value $CA_i[n]$ for the same cylinder, calculated according to the above equation and as a function of value $I_i[n]$ of the same counter. In FIG. 5, advance correction value $CA_i[n]$ varies in discrete values of 0.5° as opposed to continuously.

The advantages of the method according to the present invention are as follows.

In particular, to determine the presence or absence of detonation, the method according to the present invention operates on the basis of the difference between logarithm value $x_i$ and mean value $\mu_i$, with no need, as in the method described in Patent Application WO-97/21084, to calculate a numeric value correlated to the standard deviation of the distribution of values $x_i$. This obviously provides for greatly simplifying the processing required to determine the detonation behaviour and effectively control operation of engine 2, as well as for reducing the number of components required.

Moreover, the method according to the present invention models the detonation phenomenon by defining a threshold value $\delta_o$ valid in all operating conditions and for all types of engine 2, thus further simplifying processing and reducing the number of components required.

Moreover, the method according to the present invention provides for determining advance correction value $CA_i[n]$ using a law of correction enabling the number of detonations present at any speed of engine 2 to be "measured out" as required, and which provides for obtaining an advance correction directly proportional to the amount of detonation that has taken place.

Moreover, the method according to the present invention operates on the basis of a wide-band-filtered signal to make use of the maximum possible amount of information, even though this obviously involves also detecting the effects of other phenomena not related to detonation.

Finally, the method according to the present invention employs a mean value $\mu_i$ updating algorithm enabling the calculated mean value to rapidly follow any variations in the $x_i$ values obtained following logarithmic conversion of the integration result.

Clearly, changes may be made to the method as described and illustrated herein without, however, departing from the scope of the present invention.

What is claimed is:

1. A method of detecting and controlling detonation of an internal combustion engine (2), comprising the steps of:

a) acquiring (10) a vibration signal (D) proportional to the intensity of vibration on the crankcase;

b) wide-band filtering (11) said vibration signal (D) to generate a first intermediate signal;

c) rectifying (12) said first intermediate signal to generate a second intermediate signal;

d) integrating (13) said second intermediate signal to generate a first numeric value;

e) calculating (14) a logarithm of said first numeric value to obtain a second numeric value ($x_i$);

f) calculating (15) a mean value ($\mu_i$) as a function of said second numeric value ($x_i$);

characterized by comprising the steps of:

g) calculating (16) a difference between said second numeric value ($x_i$) and said mean value ($\mu_i$) to obtain a third numeric value ($\delta_i$);

h) comparing (17) said third numeric value ($\delta_i$) with a predetermined threshold value ($\delta_o$);

m) determining (18) the presence of detonation in the event said third numeric value ($\delta_i$) has a first predetermined relationship with said predetermined threshold value ($\delta_o$);

n) forming a detonation index indicating the behaviour of the engine in terms of detonation; and o) calculating, from said detonation index, a correction value to be added to the spark lead.

2. A method as claimed in claim 1, characterized in that said step i) comprises the step of determining (18) said presence of detonation in the event said third numeric value ($\delta_i$) is greater than or equal to said predetermined threshold value ($\delta_o$).

3. A method as claimed in claim 1, characterized by also comprising the step of:

p) determining (20) the absence of detonation in the event said third numeric value ($\delta_i$) does not have said first predetermined relationship with said predetermined threshold value ($\delta_o$).

4. A method as claimed in claim 1, characterized in that said step b) comprises the step of filtering said vibration signal (D) between 5 and 25 kHz.

5. A method as claimed in claim 1, characterized in that said threshold value ($\delta_o$) used in step h) is predetermined and constant alongside a variation in the speed of said engine (2).

6. A method as claimed in claim 1, characterized in that said step d) comprises the step of integrating said second intermediate signal in a predetermined time window during the combustion phase.

7. A method as claimed in claim 6, characterized in that said integration time window commences, during said combustion phase, immediately following the top dead-center position, and is of constant angular duration with respect to the speed of said engine (2).

8. A method as claimed in claim 1, characterized by also comprising the steps of:
   q) calculating (19, 21) a detonation index ($I_i[n]$) indicating the behaviour of said engine (2) in terms of detonation; and
   r) calculating (22) an injection advance correction value ($CA_i[n]$) as a function of said detonation index ($I_i[n]$).

9. A method as claimed in claim 8, characterized in that said step r) comprises the step of calculating (22) said injection advance correction value ($CA_i[n]$) according to the equation:

$$CA_i[n] = K_p \cdot I_i[n]$$

where $CA_i[n]$ is said injection advance correction value, $I_i[n]$ is said detonation index, and $K_p$ defines a law of correction for the injection advance.

10. A method as claimed in claim 8, characterized in that said step q) comprises the step of:
    s) calculating (19) said detonations index ($I_i[n]$) as a function of said third numeric value ($\delta_i$) and of said predetermined threshold value ($\delta_o$) in the event said third numeric value ($\delta_i$) has said first predetermined relationship with said predetermined threshold value ($\delta_o$).

11. A method as claimed in claim 4, characterized by repeating said steps from a) to r) to generate a number (i) of said second numeric values ($x_i$), of said mean values ($\mu_i$), of said third numeric values ($\delta_i$), of said detonation indexes ($I_i[n]$), and of said injection advance correction values ($CA_i[n]$).

12. A method as claimed in claim 11, characterized in that each of said detonation indexes ($I_i[n]$) is calculated (19), in the event said third numeric value ($\delta_i$) has said first predetermined relationship with said predetermined threshold value ($\delta_o$), according to the equation:

$$I_i[n] = I_{i-1}[n] - M \cdot (\delta_i - \delta_o)$$

where $I_i[n]$ is the detonation index calculated at the i-th repetition, $I_{i-1}[n]$ is the detonation index calculated at the previous repetition i−1, $\delta_i$ is the third numeric value calculated at the i-th repetition, $\delta_o$ is said predetermined threshold value, and M is a proportion coefficient.

13. A method as claimed in claim 11, characterized in that each of said detonation indexes ($I_i[n]$) is calculated (21), in the event said third numeric value ($\delta_i$) does not have said first predetermined relationship with said predetermined threshold value ($\delta_o$) according to the equation:

$$I_i[n] = I_{i-1}[n] + 1$$

where $I_i[n]$ is the detonation index calculated at the i-th repetition, and $I_{i-1}[n]$ is the detonation index calculated at the previous repetition i−1.

14. A method as claimed in claim 7, characterized in that each of said mean values ($\mu_i$) is calculated (15) according to the equation:

$$\begin{cases} \mu_i = (1 - \lambda_1) \cdot x_i + \lambda_1 \cdot \mu_{i-1} & i \geq 2 \\ \mu_1 = x_1 \end{cases}$$

where $\mu_i$ is the mean value calculated at the i-th repetition, $\mu_{i-1}$ is the mean value calculated at the previous repetition i−1, $x_i$ is the second numeric value calculated at the i-th repetition, and $\lambda_1$ is a predetermined parameter.

15. A method as claimed in claim 11, characterized in that said threshold value ($\delta_o$) used in step h) is correlated to the standard deviation value of the distribution of second numeric values ($x_i$) obtained in the absence of detonation.

* * * * *

UNITED STATES PATENT AND TRADEMARK OFFICE
CERTIFICATE OF CORRECTION

PATENT NO. : 6,411,886 B1
DATED : June 25, 2002
INVENTOR(S) : Morra et al.

It is certified that error appears in the above-identified patent and that said Letters Patent is hereby corrected as shown below:

<u>Title page,</u>
Item [22], PCT Filed, change the date from "September 9, 1999" to
-- September 9, 1998 --.

Signed and Sealed this

Twenty-sixth Day of August, 2003

JAMES E. ROGAN
*Director of the United States Patent and Trademark Office*